No. 11,810. Reissued Feb. 27, 1900.
E. R. CAHOONE.
STOVE OR RANGE.
(Application filed June 16, 1899.)
2 Sheets—Sheet 1.
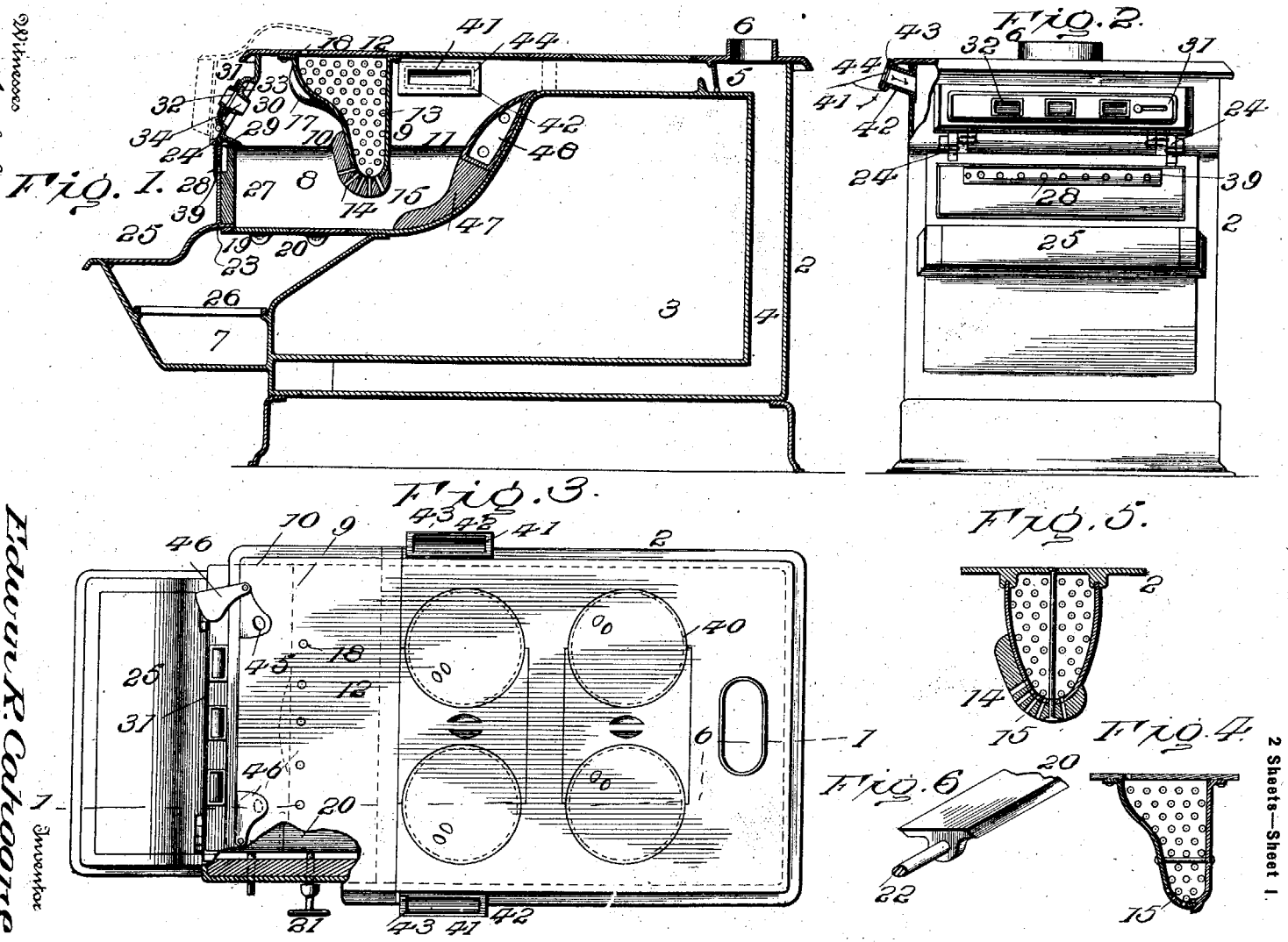
Witnesses
Wm. J. Jacobi
W. A. Williams
Inventor
Edwin R. Cahoone
By Jno. Imine
Attorney No. 11,810. Reissued Feb. 27, 1900.
E. R. CAHOONE.
STOVE OR RANGE.
(Application filed June 16, 1899.)
2 Sheets—Sheet 2.
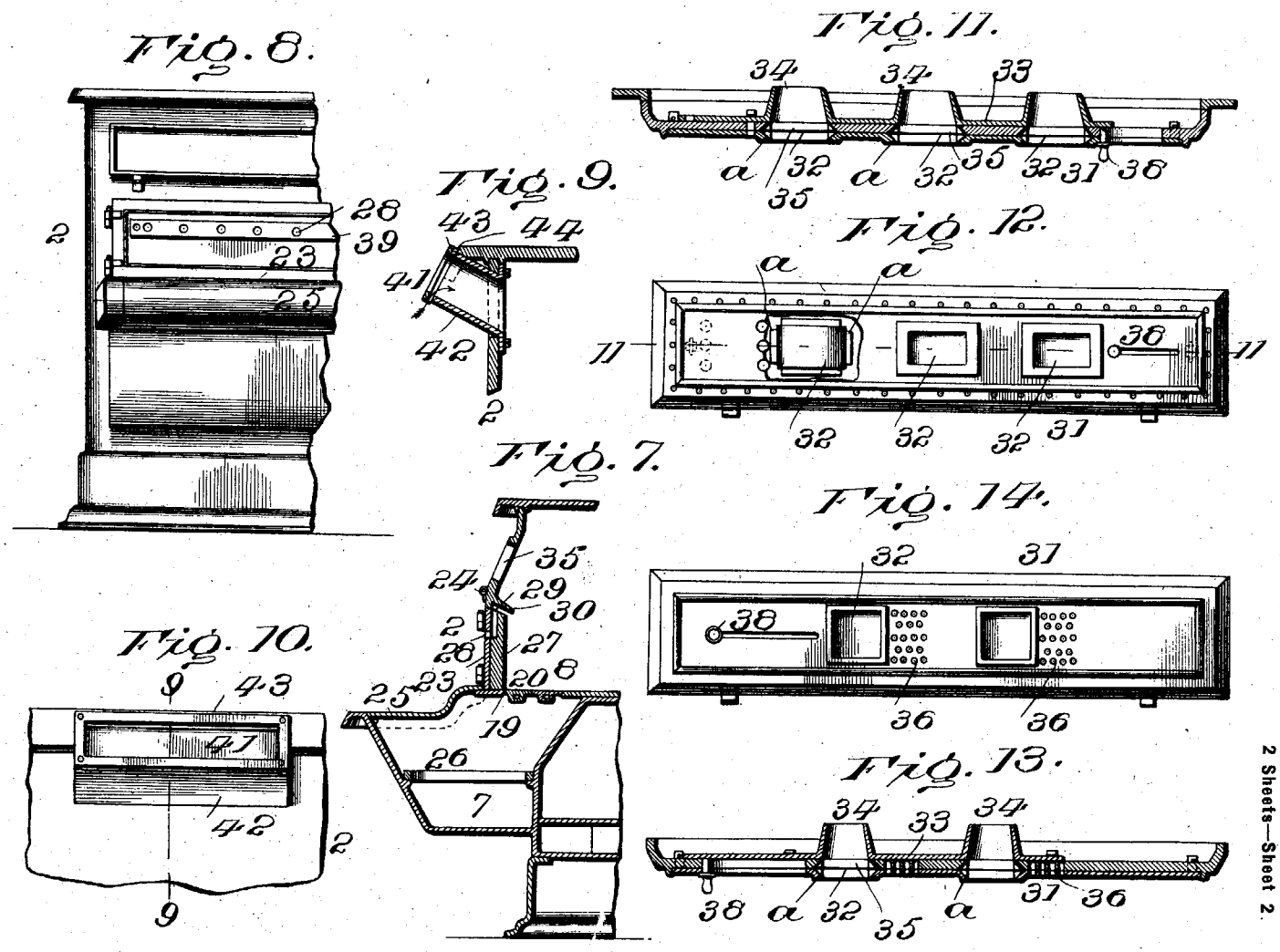
Witnesses
S. C. Goldy.
F. J. Hartman.
Inventor
Edwin R. Cahoone
by Jno. Ennis
Attorney

UNITED STATES PATENT OFFICE.

EDWIN R. CAHOONE, OF NEWARK, NEW JERSEY.

STOVE OR RANGE.

SPECIFICATION forming part of Reissued Letters Patent No. 11,810, dated February 27, 1900.

Original No. 540,716, dated June 11, 1895. Application for reissue filed June 16, 1899. Serial No. 720,820.

*To all whom it may concern:*

Be it known that I, EDWIN R. CAHOONE, of Newark, in the county of Essex and State of New Jersey, have invented certain new and useful Improvements in Stoves or Ranges; and I do hereby declare that the following is a full, clear, and exact description of the invention, which will enable others skilled in the art to which it appertains to make and use the same, reference being had to the accompanying drawings, and to the letters of reference marked thereon, which form a part of this specification.

My invention relates in the main to the class of stoves and ranges for burning soft or bituminous coal, wherein the object of the construction is to effect such perfect combustion that free carbon is substantially eliminated and the generation of smoke thereby avoided. The principal features of the invention are especially well adapted to a stove or range of this class which employs a transverse air-duct in the fuel-chamber, dividing the same into the fire-pot proper and a gas-duct, and I have shown my invention as applied to a cook-stove of such character.

The invention will be fully and clearly described hereinafter and its novel features carefully defined in the claims.

In the accompanying drawings, Figure 1 is a vertical longitudinal section of a stove embodying my invention, the plane of the section being indicated by the line 1 1 of Fig. 3; Fig. 2, a front elevation of the stove with the upper left-hand corner broken away, showing the peep-window in section; Fig. 3, a top plan view of the same with one corner of the top broken away to show one end of the fuel-supporting bed; Fig. 4, a section of the air-duct; Fig. 5, a similar view of a modified form of air-duct; Fig. 6, a perspective view of a portion of one of the pivoted rocking plates in the bed supporting the fuel; Figs. 7 and 8, slight modifications of the construction of the stove-front, Fig. 7 being a vertical section, and Fig. 8 a partial front elevation, of the same; Figs. 9 and 10, detached views, on a larger scale, of the peep-window in the side of the stove, Fig. 9 being a vertical section on line 9 9 of Fig. 10 and Fig. 10 a front view; Figs. 11 and 12, detached views of the stove-door, Fig. 11 being a longitudinal section on line 11 11 of Fig. 12 and Fig. 12 a front view, partly broken away, to show the construction; and Figs. 13 and 14 modified views of the preferred construction of stove-door.

Referring to the several views, the numeral 2 indicates an ordinary cook stove or range provided with the usual oven 3, smoke and hot-air flues 4, draft-damper 5, smoke-outlet 6, and ash-pit 7.

The numeral 8 indicates the fuel-chamber as a whole, which is partially divided by a pendent hollow partition 9 into two compartments 10 and 11, respectively, the first compartment 10 forming the fire-pot proper and the second compartment 11 forming a gas-duct. The hollow partition is attached by suitable bolts or screws to a removable top plate 12, and for convenience in casting I prefer to construct the same of two metal plates joined together at their lower edges and having the open ends closed by perforated plates 13, through which air is admitted to the interior of said partition. The lower portion of the hollow partition is covered with a protecting-tile 14, of fire-clay or like refractory material, properly molded to shape and secured to the partition by bolts or screws. Both the partition and its refractory covering are provided with air-jets 15, and as thus constructed the hollow partition forms an air-duct from which the highly-heated air is emitted to combine with the gases passing from the fire-pot out through the gas-duct 11. Both the fire-pot and gas-duct are lined at their ends with properly-molded bricks or tiles 16 of refractory material. The partition or air-duct at its upper front part is preferably formed with a pocket 17, and air is admitted to the same through inlets 18 in the top plate 12. By this construction a large air-space is formed in the upper part of the partition or air-duct, where it will not interfere with the operation of the stove, and the constant influx of air to this space will prevent the overheating of and injury to the partition or air-duct.

Attaching the partition or air-duct to the removable plate 12 forms an important feature of the invention, as by such construction the partition or air-duct may be readily lifted out without disturbing any other part or parts of the stove, the plate being entirely independent of the other portion of the stove-top. When the partition or air-duct is removed, the entire fuel-chamber will be open for inspection and repair.

The numeral 19 indicates an imperforate bed on which the fuel is supported, and preferably mounted in this bed are two or more plates 20, pivoted at their ends in the side walls of the stove and adapted to close snugly together at their beveled edges, (seen in Fig. 3,) where the top of the stove is partly broken away, and in Fig. 6, where a portion of one of the plates is shown in perspective. The purpose of these plates, which are similar to butterfly-valves, is to permit of some of the lighter particles of the ashes being discharged from the bottom of the fuel-bed into the ash-pit and not for the admission of air. Each plate or valve is independent and may be rocked by means of a detachable wrench or crank 21 from the outside of the stove. In order to give stable equilibrium to the plate or valve, the stem 22 (see Fig. 6) is flattened on its under side, where it rests in its bearing.

In order to obtain access to the fire-pot for cleaning out the ashes and cinders, the stove-front 23 is hung on hinges 24, so that it may be swung out. In Figs. 1, 2, and 3 the hinges are at the top or upper edge of the front 23, so that the latter may swing up, and the hearth-plate 25, which covers the ash-pit, is integrally connected to or cast with said front, so that both may be swung up and down together, as indicated by the dotted lines in Fig. 1. When the stove-front is thus thrown open, the ashes and cinders may be drawn over the edge of the fuel-bed into the ash-pit, where they fall onto a removable grid 26, supported upon suitable lugs in the ash-pit. This enables the ashes to be sifted and the combustible portions thereof returned to the fire-box.

The hinged stove-front 23 is preferably of cast-iron lined on its inner face with fire-brick or tile 27, which when the front is closed forms part of the refractory lining of the fire-pot. Near the upper edge the hinged front is provided with apertures 28, which open into vertical flues or recesses 29, formed in the outer face of the tile 27, and thence into the fire-pot at the upper edge of said tile. By means of these apertures and flues or recesses air is admitted at the top of the fuel. Fuel and cinders are prevented from getting into the flues or recesses 29 by means of a lip or ledge 30, formed on the front plate of the stove, projecting out over the upper edge of the tile in which the flues or recesses are formed.

The numeral 31 indicates the fuel-charging door, the preferred construction being shown in Figs. 13 and 14, which do not, however, materially differ from that shown in Figs. 11 and 12.

Referring to the general construction shown in each of the several figures, the door proper is formed of two plates having openings for the mica windows 32, which are clamped and held between the plates at their corners only, as shown, where the outer plate of the door is broken away in Fig. 12 about one of the windows. Except at the corners the margins of the openings are beveled, as shown at *a* in Figs. 11, 12, and 13, so as to form air-inlets about the mica at its four sides. On the inner face of the door is mounted a slide 33, having openings adapted to register with the windows 32 and trunks or tubes 34, projecting inwardly from about each aperture. The door is provided with apertures 35, with which the trunks or tubes are made to register, so as to admit currents of air into the fire-pot, and as these trunks or tubes project in a downwardly-inclined direction it will be seen that the currents of air will be directed down upon the bed of fuel, the admission of air being regulated by the slide 33. In burning soft coal it is not usual to employ mica windows, as the mica is liable to become so coated with soot as to destroy its transparent character; but as the mica windows are not intended to be used when the smoke is excessive—as for example, when kindling a fresh fire or putting on fresh fuel—they are kept comparatively free from the accumulation of soot by being screened by the solid portion of the slide 33. When the fire is kindled or fresh coal put on, the slide 33 is moved a sufficient distance to one side to take the trunks or tubes out of register with the mica windows, and when thus shifted the trunks or tubes register with the apertures 35 and air is admitted therethrough. When it is desired, however, to cut off the supply of air entirely, the slide 33 may be moved still farther, so that it will close both the mica windows and the air-apertures 35.

The construction of the charge-door shown in Figs. 11 and 12 is precisely the same as that shown in Figs. 13 and 14, except that owing to the employment of an extra mica window—three instead of two—the slide 33 cannot be shifted so far and the air-inlet apertures 35 cannot be employed. Nevertheless it is possible in this construction to use apertures 36, which are made to register with corresponding apertures 37 in the slide 33, when the latter is so shifted as to screen the mica windows. The slide 33 is operated by a knob 38 or equivalent means.

In lieu of hinging the stove-front at its upper edge, so that it may be raised or swung up, it may be hinged at one side so as to swing like a door, and in lieu of connecting the hearth-plate with said front it may be made separate, so as to be lifted off and set to one side when the front is to be opened. These constructions are clearly illustrated in Figs. 7 and 8. Either of the constructions shown in the several figures may be employed.

The apertures 28 in the stove-front 23 may be left open or furnished with a register-slide 39 at the option of the maker. In the drawings, Figs. 1, 2, and 8, such a slide is illustrated somewhat diagrammatically.

The plates or valves 20 in the fuel-supporting bed need not occupy the entire bed nor need they be so wide relatively, as represented in Fig. 1. In Fig. 7 they are represented as narrower and occupying a place at the front of the bed enly.

As it is desirable to have some means by which the gas-duct 11 may be inspected without having to raise one of the lids or pot-hole covers 40, I provide a mica window 41 in the end of the gas-duct. In carrying out this construction (best seen in Figs. 9 and 10) I attach to the stove or form integrally therewith an inclined trunk or tube 42, which opens into the gas-duct through the side wall of the stove. In the outer end of this trunk or tube is placed the mica window 41. The plate of mica is clamped between two frames 43 and 44, the latter being cut away at its lower side to leave or form a restricted air-inlet under the edge of the mica. I find that the trunk or tube 42 prevents the smoke from getting to the mica and depositing soot thereon, being assisted by the air entering under the mica, (see arrow in Fig. 9,) which creates a current inwardly through the trunk or tube.

In order to facilitate slicing or stirring the fire in the fire-pot without interfering with the draft, I provide in the top plate of the stove (see Fig. 3) a poke-hole 45, covered by a wicket 46, hinged to the top plate. I prefer to recess the wicket in the top plate and to arrange the recess at the front edge of the stove, so that the wicket may be turned outward laterally, as shown in Fig. 3.

For a cooking-stove which is adapted to be set with either side next to a wall I prefer to provide two mica windows 41 and two wicket-covered poke-holes 45. This duplication is seen in Fig. 3, in which figure one of the wickets is shown displaced.

The back part of the gas-duct 11 is formed as to its lower part by a curved tile 47 and as to its upper part by a water-back 48. Both of these features are clearly shown in Fig. 1. In stoves of this class, so far as I am aware, water-backs have not been employed, owing to the difficulty of getting sufficient heat when situated in the usual place at the front of the fire-box. The back wall of the gas-duct has an ogee form to properly direct the flames and gases, and if the water-back be omitted a tile or plate of the proper form should be substituted therefor.

The trunks or tubes form an important feature of my invention, as by means of their peculiar shape and position, having a contracted outlet and preferably projecting into the combustion-chamber in a downwardly-inclined direction, the air is delivered in currents or streams toward the bed of fuel at individual points. Under the influence of the draft these currents or streams of air are drawn down through the bed of fuel, causing channels to be formed down through the bed of fuel. The walls of these channels become incandescent under the action of the currents of air and gradually extending the entire bed of fuel becomes an incandescent mass, thus insuring perfect combustion. The admission of air through the trunks or tubes is regulated by the slide 33, and after the fuel becomes incandescent the slide may be shifted to bring the trunks or tubes in register with the mica windows, so that the fire may be inspected.

I do not wish to limit myself to the specific construction shown herein in all respects, as this may be varied to some extent without departing materially from my invention. For example, as the partition or air-duct is supported in the lining 16 it is not absolutely essential that it shall be secured to the plate 12 at the top. The lining of the stove-front, and, indeed, of the entire fuel-chamber, might be of metal; but fire-tiles are preferred.

The removable front may be secured in any known manner to the stove-frame; but I prefer to hinge it. The function of this front is to throw open the fire-pot, so that coke and unburned coal may be readily removed.

The frame about the mica in the door, Figs. 11 and 12, may be recessed in any convenient manner to permit air to enter the fire-pot.

Having thus described my invention, what I claim is—

1. In a downdraft-stove, the combination of a fire-pot or magazine and a plurality of trunks or tubes extending downwardly from the upper part of the fire-pot, from a plane above the level of the bed of fuel, and adapted to direct jets of air toward the bed of fuel for its combustion, all constructed for the purpose of conducting the air and the products of combustion downwardly through the fuel under the influence of the draft.

2. A stove having a fuel-magazine, a partition extending downwardly a predetermined distance therein to divide said fuel-magazine into a fire-pot proper and a gas duct or flue, and one or more trunks or tubes adapted to deliver air into the fire-pot down upon the bed of fuel.

3. In a stove, the combination with the fuel-magazine, of a hollow partition extending a predetermined distance down into the fuel-magazine to divide the same into a fire-pot proper and a gas duct or flue, said hollow partition being provided with air inlets and outlets, and a plurality of trunks or tubes adapted to deliver air into the fire-pot.

4. In a stove, the combination with the fuel-magazine, of an air-duct extending a predetermined distance down into the fuel-magazine to divide the same into a fire-pot proper and a gas-duct, one or more air trunks or tubes, and an imperforate fuel-support, whereby jets of air are directed upon the bed of fuel and drawn therethrough under the influence of the draft.

5. A stove or range having a fuel-magazine and a transverse air-duct and perforated partition separating said fuel-magazine into a fire-pot proper and a gas-duct, said air-duct being suspended from a removable section of the top plate of the stove or range in front of the pot-holes, substantially as set forth.

6. A stove or range having a fuel-magazine and provided with a divided top plate, one section of which is arranged in front of the front pot-holes, and a removable, transverse air-duct and perforated partition which is arranged under said front section and divides the fuel-magazine into the fire-pot proper and the gas-duct, substantially as set forth.

7. A stove or range having a fuel-chamber therein provided with a transverse air-duct, said duct having a pocket at its upper part, the top plate of the stove having air-inlets to admit air to said pocket.

8. The combination with a stove or range having in it a fuel-chamber, of the metal air-duct extending transversely across said chamber, said duct being provided at its narrow, lower part with a protecting-tile, and at its upper part with a pocket extending toward the front of the stove and adapted to receive air through apertures in the stove-top.

9. A stove or range for burning bituminous coal, having a fuel-magazine, a transverse air-duct and partition, and a gas-duct back of said partition, the back wall of said flue being formed of a curved tile at its lower part and a water-back above said tile and resting thereon, as set forth.

10. A stove or range for burning bituminous coal, having a fuel-magazine, a transverse air-duct and partition, a gas-duct back of said air-duct, a charging-door and an imperforate fire-bed, and having a hinged front extending from the fire-bed up nearly to the charging-door and lined with a refractory tile, said front forming the front wall of the fuel-chamber, substantially as set forth.

11. A stove or range for burning bituminous coal, having a fuel-magazine, a transverse air-duct and partition, a gas-duct back of said air-duct, a charging-door and an imperforate fire-bed, and having a front, which extends from the fire-bed up nearly to the charging-door, said front being hinged at its upper edge, connected at its lower edge to the hearth-plate, and lined with refractory tiles or material, substantially as set forth.

12. A stove or range for burning bituminous coal, having a front for the fuel-chamber, hinged to the stove-front and a projecting lip below the charging-door, the said front having air-inlets, and a tile on its inner face with recesses which register with the inlets and open out of the upper edge of the tile under the lip, substantially as set forth.

13. A stove or range having a fuel-magazine at its front part, the top plate of said magazine having a wicket-recess at its front edge and a poke-hole of small size in said recess, and having a covering-wicket set in said recess so as to close said poke-hole normally, said wicket being adapted to swing out of said recess toward the front for uncovering the poke-hole, as set forth.

14. A stove for burning bituminous coal having in its side at the top plate an aperture provided with an inclined trunk and a peep-window of mica at the outer end of said trunk, substantially as set forth.

15. A stove or range for burning bituminous coal, having a transverse air-duct and a gas-duct back of said air-duct, and having also a peep-window of mica in the side of the stove at the end of said gas-duct, said window being situated at about the level of the top of the stove, substantially as set forth.

16. A stove or range for burning bituminous coal, having a charging-door provided with a mica window and having an apertured sliding screen mounted on the inner face of the door and adapted to be moved into and out of register with said window, said screen having a trunk at the aperture therein, substantially as set forth.

17. A stove or range for burning bituminous coal, having a charging-door provided with a mica window having passages for air about the mica, and having an apertured slide mounted on the inner face of the door and provided with a trunk about the aperture therein, said slide being adapted to put the aperture therein into or out of register with the mica window, substantially as set forth.

18. A stove or range having a fuel-magazine, a gas-duct and a transverse, pendent, hollow partition between said magazine and gas-duct, the back wall of said gas-duct having the peculiar ogee form shown, that is, a concavity at its lower part and a substantially-vertical middle portion, whereby the gases are deflected upward, and a backwardly-flared upper part, all as set forth.

19. A stove or range for burning bituminous coal, having a fuel-magazine and a transverse air-duct and partition at the rear of same, and having a removable front between the fire-bed and the charging-door which front forms the front wall of the fuel-magazine and extends down to the fire-bed, whereby the fire-box may be opened for the removal of coke and unburned fuel.

20. In a downdraft-stove, the combination of a fire-pot or magazine, a plurality of trunks or tubes, constructed and arranged to deliver jets or currents of air down upon or toward the bed of fuel, and means for conducting or drawing the jets or currents of air downwardly through the fuel.

21. In a downdraft-stove, the combination of a fire-pot or magazine, an imperforate fuel-support, and a plurality of trunks or tubes, constructed and arranged to deliver jets or currents of air down upon or toward the bed of fuel, and means for conducting or drawing the jets or currents of air downwardly through the fuel.

22. In a downdraft-stove, the combination of a fire-pot or magazine, having an opening at or near the bottom thereof, said opening communicating with a flue leading to the chimney, an imperforate fuel-support at the bottom of the fire-pot or magazine, and a plurality of trunks or tubes for delivering jets or currents of air down upon or toward the fuel-bed, all constructed for the purpose of conducting the jets or currents of air downwardly through the fuel under the influence of the draft.

23. In a downdraft-stove, the combination of a fire-pot or magazine having a lateral opening at or near its bottom communicating with a flue leading to the chimney, a fuel-support at the bottom of the fire-pot or magazine, a plurality of air-tubes extending downwardly from the upper portion of the fire-pot from a plane above the level of the fuel and adapted to direct jets of air toward the fuel for its combustion, and a gas-duct contiguous to the walls of the fire-pot or magazine; all constructed for the purpose of conducting the air and the products of combustion downwardly through the fuel and through the lateral opening in the fire-pot or magazine under the influence of the draft, substantially as described.

24. In a downdraft-stove, the combination of a fire-pot or magazine having a lateral opening at or near its bottom communicating with a flue leading to the chimney, a fuel-support at the bottom of the fire-pot or magazine, a plurality of air-tubes extending downwardly from the upper portion of the fire-pot or magazine to direct jets of air into the fuel, and an ash-pit normally closed off from the external air to prevent an upward draft; all constructed for the purpose of conducting the air and the products of combustion downwardly through the fuel and through the lateral opening in the fire-pot or magazine under the influence of the draft, substantially as described.

In witness whereof I have hereunto signed my name in the presence of two subscribing witnesses.

EDWIN R. CAHOONE.

Witnesses:
FRANK A. BAKER,
C. E. SHACKLADY.